(12) United States Patent
Fujishiro et al.

(10) Patent No.: US 12,483,932 B2
(45) Date of Patent: Nov. 25, 2025

(54) COMMUNICATION CONTROL METHOD

(71) Applicant: KYOCERA Corporation, Kyoto (JP)

(72) Inventors: Masato Fujishiro, Yokohama (JP);
Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 405 days.

(21) Appl. No.: 18/303,400

(22) Filed: Apr. 19, 2023

(65) Prior Publication Data

US 2023/0262518 A1 Aug. 17, 2023

Related U.S. Application Data

(63) Continuation of application No. PCT/JP2021/038145, filed on Oct. 14, 2021.

(60) Provisional application No. 63/093,386, filed on Oct. 19, 2020.

(51) Int. Cl.
*H04W 28/06* (2009.01)

(52) U.S. Cl.
CPC .................... *H04W 28/06* (2013.01)

(58) Field of Classification Search
CPC ..................................... H04W 28/06
See application file for complete search history.

(56) References Cited

U.S. PATENT DOCUMENTS

| 7,349,425 B2 | 3/2008 | Leung et al. |
| 2020/0100142 A1 | 3/2020 | Kim |
| 2020/0314690 A1 | 10/2020 | Kim |
| 2023/0171844 A1* | 6/2023 | Liu ............... H04L 1/1864 |
| 2023/0262518 A1 | 8/2023 | Fujishiro et al. |

FOREIGN PATENT DOCUMENTS

| JP | 2004-533152 A | 10/2004 |
| WO | 2007/111320 A1 | 10/2007 |
| WO | 2022/085573 A1 | 4/2022 |

OTHER PUBLICATIONS

Kyocera, "Initial consideration of NR MBS", 3GPP TSG-RAN WG2 #111-e, R2-2007774, Online, Aug. 17-28, 2020, total 9 pages.
Huawei et al., "CR on 38.323 for NR mobility enhancement", 3GPP TSG-RAN2 Meeting #110-e, R2-2005758, Electronic, Jun. 1-12, 2020, total 14 pages.

(Continued)

*Primary Examiner* — Brenda H Pham
(74) *Attorney, Agent, or Firm* — Studebaker Brackett PLLC

(57) ABSTRACT

A communication control method used in a mobile communication system, the mobile communication system providing a multicast broadcast service (MBS) from a base station to a user equipment, the communication control method including, by the base station, performing header compression processing in which transmission of header information is omitted, the header information being static information included in a header of an MBS packet, and transmitting a compressed MBS packet subjected to the header compression processing, and transmitting, by the base station, after starting transmitting of the compressed MBS packet, the header information separately from the compressed MBS packet.

3 Claims, 13 Drawing Sheets

(56) References Cited

OTHER PUBLICATIONS

LG Electronics, "Addition of a duplicate discard window", 3GPP TSG-RAN2 Meeting #62, R2-082876, Kansas City, USA, May 5-9, 2008, total 12 pages.

3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.

Intel Corporation; Consideration of L2 protocol impact by MBS; 3GPP TSG-RAN WG2 meeting #111-e; R2-2006952; Electronic meeting; Aug. 17-28, 2020; pp. 1-6, [retrieval date, Aug. 7, 2020], Online <URL:https://www.3gpp.org/ftp/TSG_RAN/WG2_RL2/TSGR2_111-e/Docs/R2-2006952.zip>.

MediaTek Inc.; Overview on NR MBS Architecture; 3GPP TSG-RAN WG2 Meeting #111 electronic; R2-2006574; Online; Aug. 17-28, 2020; pp. 1-10, [retrieval date, Aug. 7, 2020], Online <URL:https://www.3gpp.org/ftp/TSG_RAN/WG2_RL2/TSGR2_111-e/Docs/R2-2006574.zip>.

\* cited by examiner

COMMUNICATION CONTROL METHOD

RELATED APPLICATIONS

The present application is a continuation based on PCT Application No. PCT/JP2021/038145, filed on Oct. 14, 2021, which claims the benefit of U.S. Provisional Application No. 63/093,386 filed on Oct. 19, 2020. The content of which is incorporated by reference herein in their entirety.

TECHNICAL FIELD

The present disclosure relates to a communication control method used in a mobile communication system.

BACKGROUND OF INVENTION

In recent years, a mobile communication system of the fifth generation (5G) has attracted attention. New Radio (NR), which is a Radio Access Technology (RAT) of the 5G System, has features such as high speed, large capacity, high reliability, and low latency compared to Long Term Evolution (LTE), which is a fourth generation radio access technology.

CITATION LIST

Non-Patent Literature

Non-Patent Document 1: 3GPP Technical Specification "3GPP TS 38.300 V16.3.0 (2020-09)"

SUMMARY

In a first aspect, a communication control method is used in a mobile communication system, the mobile communication system providing a multicast broadcast service (MBS) from a base station to a user equipment, the communication control method including, by the base station, performing header compression processing in which transmission of header information is omitted, the header information being static information included in a header of an MBS packet, while transmitting a compressed MBS packet subjected to the header compression processing, and transmitting, by the base station, after starting transmitting of the compressed MBS packet, the header information separately from the compressed MBS packet.

In a second aspect, a communication control method is used in a mobile communication system, the mobile communication system providing a multicast broadcast service (MBS) from a base station to a user equipment, the communication control method including receiving, by the user equipment, an MBS packet from the base station, and configuring, by a Packet Data Convergence Protocol (PDCP) entity of the user equipment, a PDCP sequence number included in the MBS packet received first from the base station to be an initial value of a variable used for a predetermined PDCP operation.

In a third aspect, a communication control method is used in a mobile communication system, the mobile communication system providing a multicast broadcast service (MBS) from a base station to a user equipment, the communication control method including receiving, by the user equipment, an MBS packet from the base station via an MBS data bearer, and by a Service Data Adaptation Protocol (SDAP) layer of the user equipment, considering that an SDAP header is not added to the MBS packet and delivering the MBS packet to a higher layer without performing SDAP header removal processing on the MBS packet.

In a fourth aspect, a communication control method is used in a mobile communication system, the mobile communication system providing a multicast broadcast service (MBS) from a base station to a user equipment, the communication control method including mapping, by the base station, one or more Quality of Service (QoS) flows belonging to one MBS session to a plurality of MBS data bearers, and multiplexing, by the base station, a plurality of logical channels corresponding to the plurality of MBS data bearers by using one RNTI (Radio Network Temporary Identifier) and transmitting the plurality of logical channels multiplexed.

DESCRIPTION OF EMBODIMENTS

Introduction of multicast broadcast services to the 5G system (NR) has been under study. NR multicast broadcast services are desired to provide enhanced services compared to LTE multicast broadcast services.

The present invention provides enhanced multicast broadcast services.

A mobile communication system according to an embodiment is described with reference to the drawings. In the description of the drawings, the same or similar parts are denoted by the same or similar reference signs.

Configuration of Mobile Communication System

Figure 1:
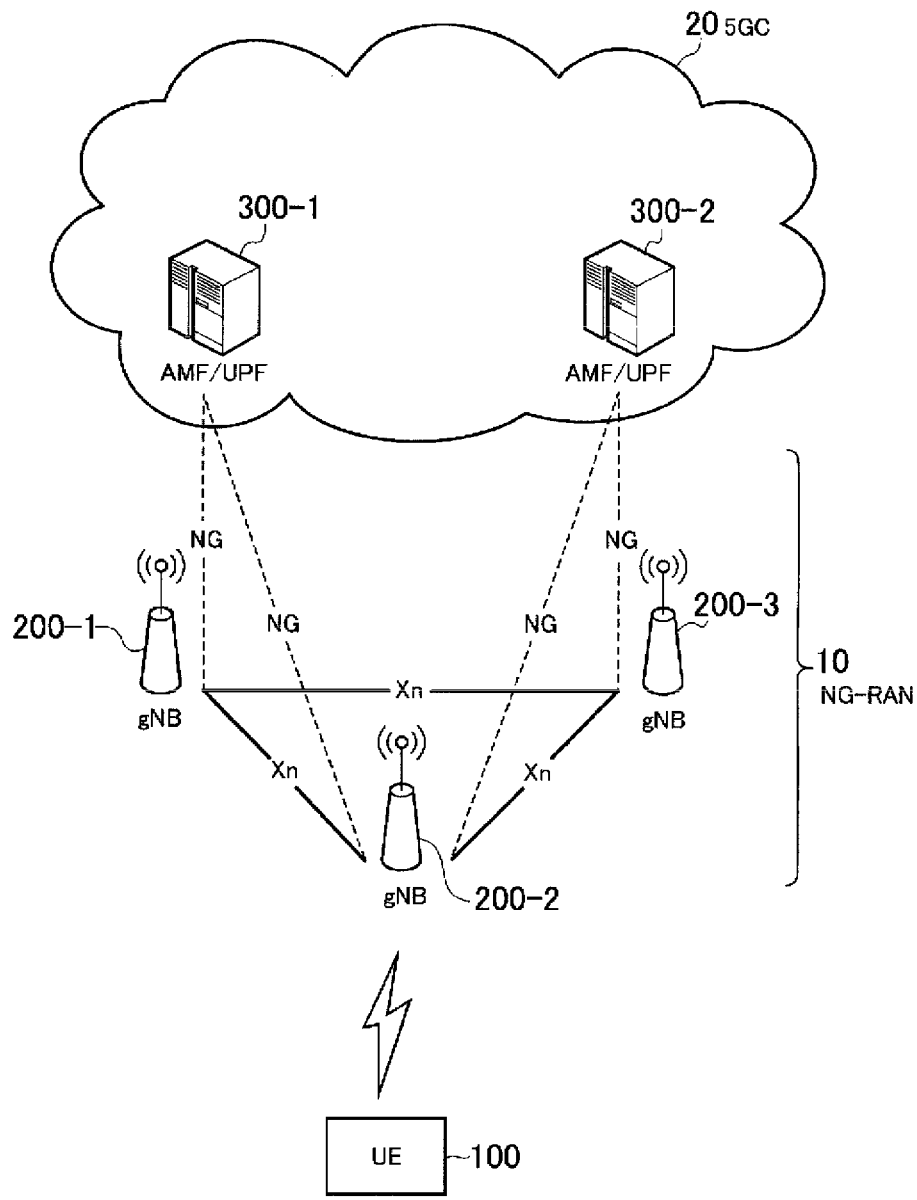
FIG. 1 is a diagram illustrating a configuration of a mobile communication system according to an embodiment.

First, a configuration of a mobile communication system according to an embodiment is described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system or the sixth generation (6G) system may be at least partially applied to the mobile communication system.

As illustrated in FIG. 1, the mobile communication system includes a user equipment (UE) 100, a 5G radio access network (next generation radio access network (NG-RAN)) 10, and a 5G core network (5GC) 20.

The UE 100 is a mobile wireless communication apparatus. The UE 100 may be any apparatus as long as utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), or a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or a plurality of cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
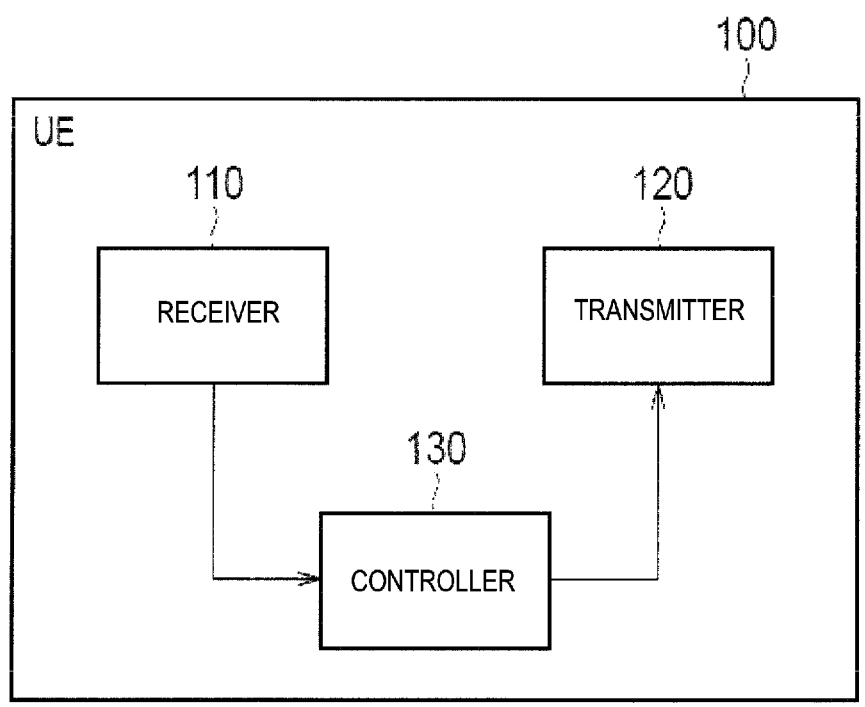
FIG. 2 is a diagram illustrating a configuration of a user equipment (UE) according to an embodiment.

FIG. 2 is a diagram illustrating a configuration of the UE 100 (user equipment) according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
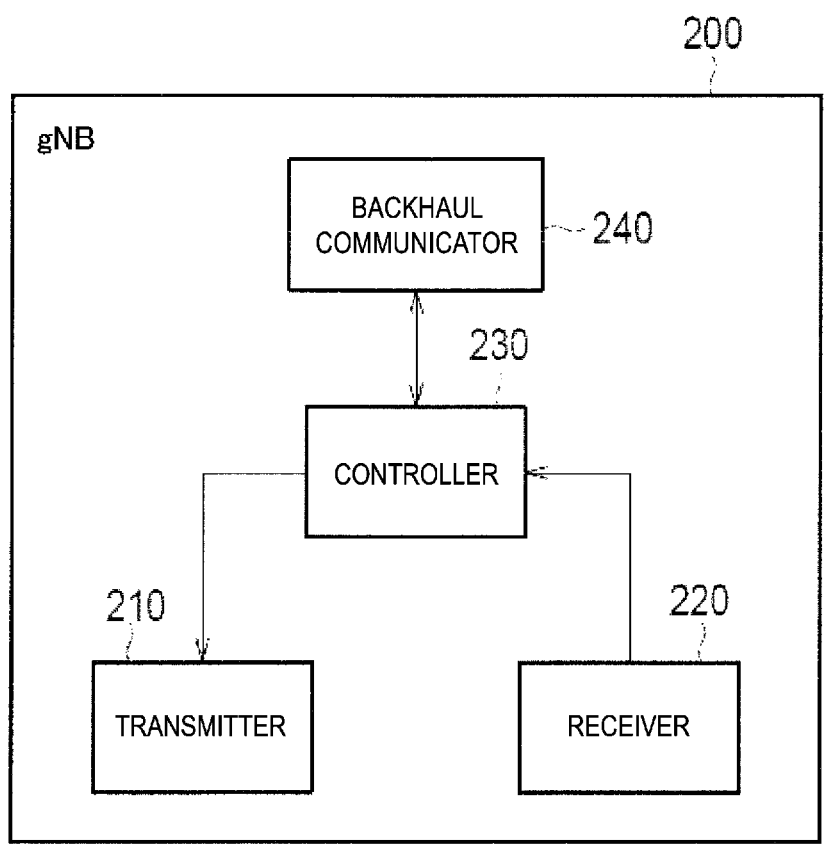
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
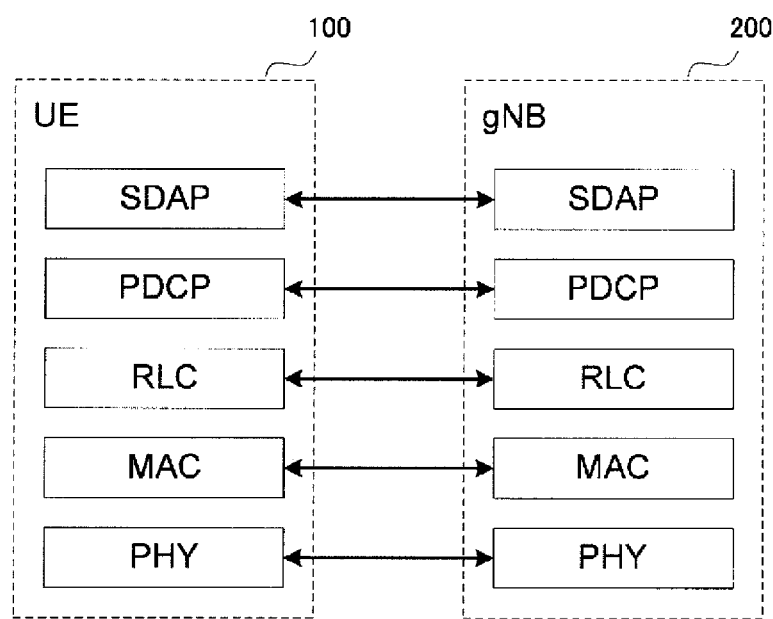
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs preferential control of data, retransmission processing using a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow as the unit of QoS (Quality of Service) control by a core network and a radio bearer as the unit of QoS control by an access stratum (AS). Note that, when the RAN is connected to the EPC, the SDAP may not be provided.

Figure 5:
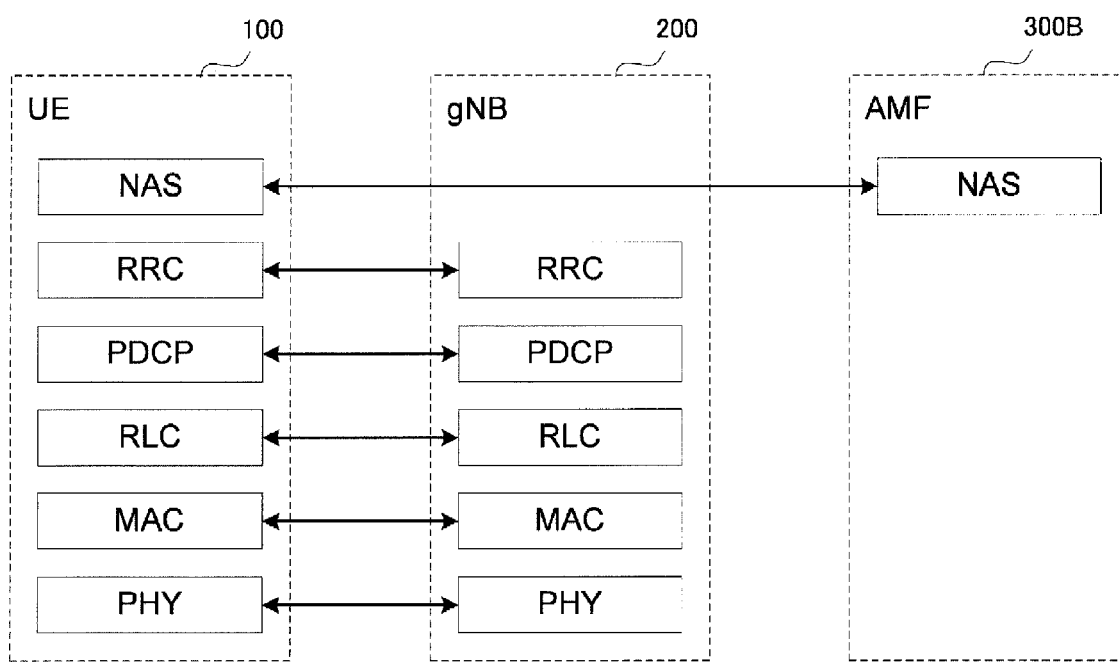
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is higher than the RRC layer performs session management, mobility management, and the like. NAS signaling is transmitted between the NAS layer of the UE 100 and the NAS layer of the AMF 300B.

Note that the UE 100 includes an application layer other than the protocol of the radio interface.

MBS

The MBS according to an embodiment is described. The MBS is a service in which the NG-RAN 10 provides broadcast or multicast, that is, point-to-multipoint (PTM) data transmission to the UE 100. The MBS may be referred to as the Multimedia Broadcast and Multicast Service (MBMS). Note that use cases (service types) of the MBS include public communication, mission critical communication, V2X (Vehicle to Everything) communication, IPv4 or IPv6 multicast delivery, IPTV, group communication, and software delivery.

Figure 6:
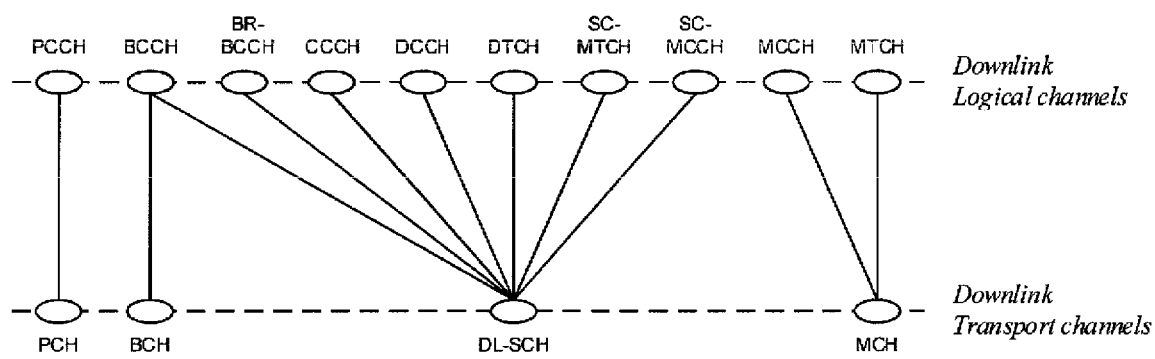
FIG. 6 is a diagram illustrating a correspondence relationship between a downlink Logical channel and a downlink Transport channel according to an embodiment.

MBS Transmission in LTE includes two schemes, i.e., a Multicast Broadcast Single Frequency Network (MBSFN) transmission and Single Cell Point-To-Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Control Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission, and corresponds to broadcast or multicast data transmission on a cell-by-cell basis. The physical channels used for SC-PTM transmission are a Physical Downlink Control Channel (PDCCH) and a Physical Downlink Control Channel (PDSCH), and enables dynamic resource allocation.

Although an example will be mainly described below in which the MBS is provided using the SC-PTM transmission scheme, the MBS may be provided using the MBSFN transmission scheme. An example will be mainly described in which the MBS is provided using multicast. Accordingly, the MBS may be interpreted as multicast. Note that, the MBS may be provided using broadcast.

MBS data refers to data transmitted by the MBS, an MBS control channel refers to the MCCH or SC-MCCH, and an MBS traffic channel refers to the MTCH or SC-MTCH. However, the MBS data may be transmitted in unicast. The MBS data may be referred to as MBS packets or MBS traffic.

The network can provide different MBS services for respective MBS sessions. The MBS session is identified by at least one of Temporary Mobile Group Identity (TMGI) and a session identifier, and at least one of these identifiers is referred to as an MBS session identifier. Such an MBS session identifier may be referred to as an MBS service identifier or a multicast group identifier.

Figure 7:
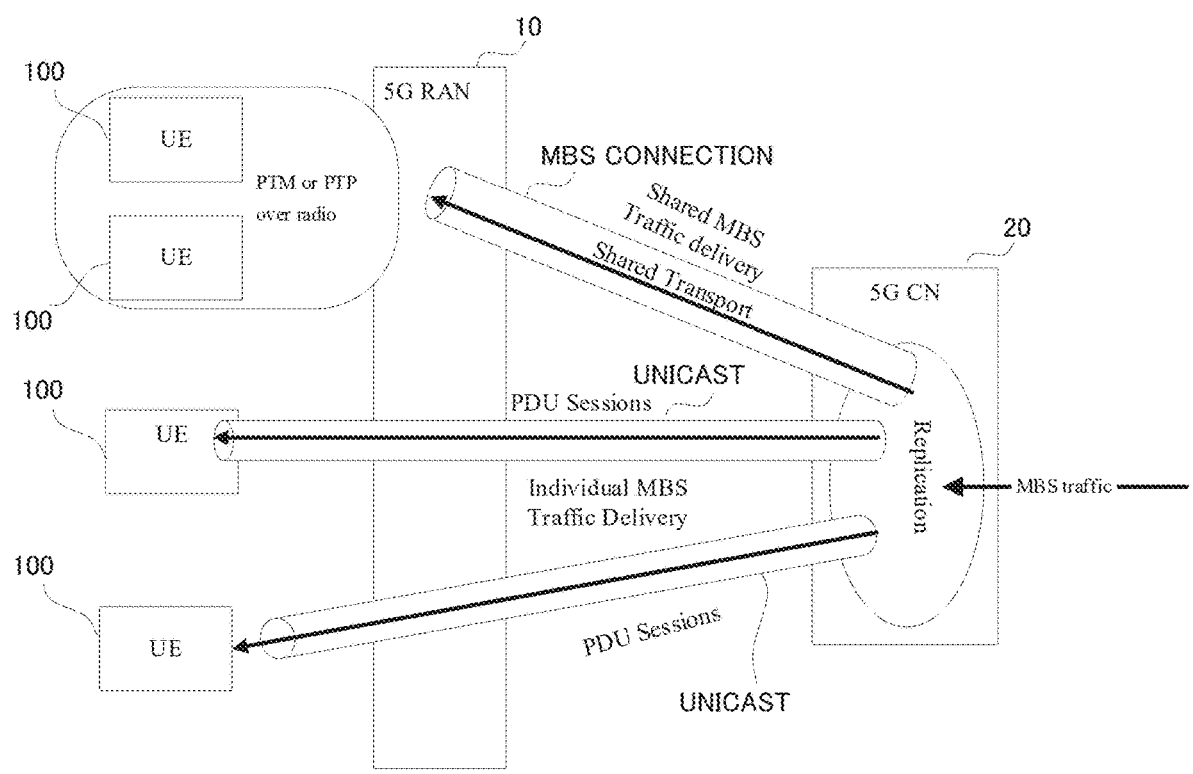
FIG. 7 is a diagram illustrating a delivery method of MBS data according to an embodiment.

FIG. 7 is a diagram illustrating a delivery method of the MBS data according to an embodiment.

As illustrated in FIG. 7, the MBS data (MBS traffic) is delivered from a single data source (application service provider) to a plurality of UEs. The 5G CN (5G) 20, which is a 5GC core network, receives the MBS data from the application service provider and performs replication of the MBS data to deliver the resultant.

From the perspective of the 5GC 20, two delivery methods are possible: shared MBS data delivery (shared MBS traffic delivery) and individual MBS data delivery (individual MBS traffic delivery).

In the shared MBS data delivery, a connection is established between the NG-RAN 10 that is a 5G radio access network (5G RAN) and the 5GC 20 to deliver the MBS data from the 5GC 20 to the NG-RAN 10. Such a connection (a tunnel) is hereinafter referred to as an "MBS connection".

The MBS connection may be referred to as a shared MBS traffic delivery connection or a shared transport. The MBS connection terminates at the NG-RAN 10 (i.e., the gNB 200). The MBS connection may correspond to an MBS session on a one-to-one basis. The gNB 200 selects any of PTP (Point-to-Point: unicast) and PTM (Point-to-Multipoint: multicast or broadcast) according to its own determination, and transmits the MBS data to the UE 100 using the selected method.

On the other hand, in the individual MBS data delivery, a unicast session is established between the NG-RAN 10 and the UE 100 to individually deliver the MBS data from the 5GC 20 to the UE 100. Such unicast may be referred to as a PDU session. The unicast (PDU session) terminates at the UE 100.

In the following embodiments, an example is mainly described in which a gNB 200 performs PTM MBS transmission.

Header Compression Processing

Header compression processing according to an embodiment is described.

Figure 8:
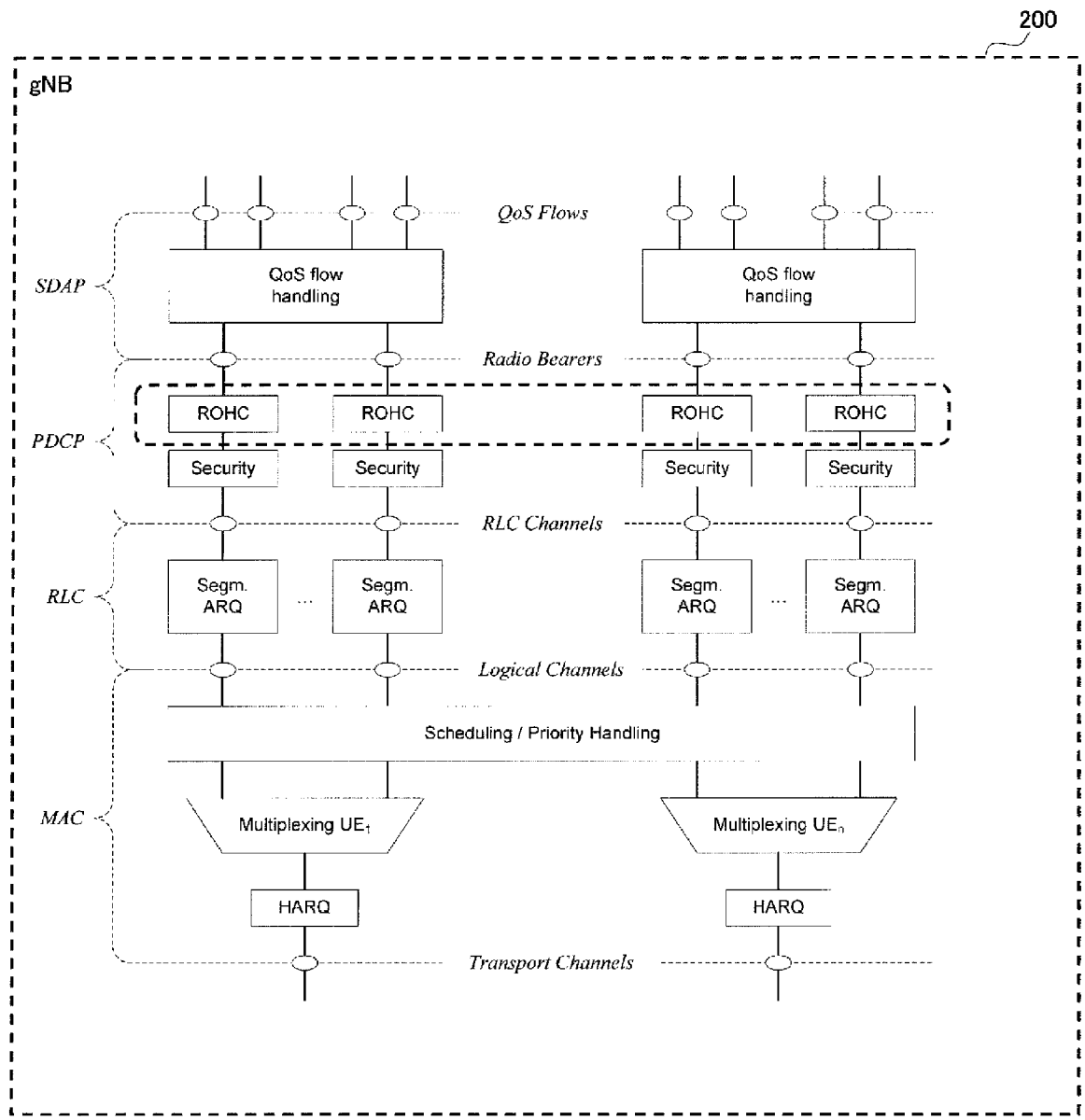
FIG. 8 is a diagram illustrating a layer 2 structure of the gNB in the downlink according to an embodiment.

FIG. 8 is a diagram illustrating a layer 2 structure of the gNB 200 in the downlink according to an embodiment.

As illustrated in FIG. 8, the physical layer provides transport channels to the MAC layer. The MAC layer provides logical channels to the RLC layer. The RLC layer provides RLC channels to the PDCP layer. The PDCP layer provides radio bearers to the SDAP layer. The SDAP layer provides QoS flows.

Here, since the logical channels and the RLC channels are in one-to-one correspondence, and the RLC channels and the radio bearers are in one-to-one correspondence, the logical channels and the radio bearers are also in one-to-one correspondence. In contrast, the QoS flows and the radio bearers are not in one-to-one correspondence. Therefore, the SDAP layer performs processing of associating (mapping) the QoS flow with the radio bearer.

The PDCP layer includes a PDCP entity provided for each radio bearer. Each PDCP entity has a function to perform processing by RoHC (Robust Header Compression). Although an example is described below in which the RoHC is used as a header compression protocol, another protocol, for example, EHC (Ethernet Header Compression) may be used. The RoHC function performs compression processing of an IP header (hereinafter simply referred to as "header compression processing"). Data targeted for the RoHC is user data flowing on a data radio bearer. Examples of headers that can be compressed by the RoHC include RTP, UDP, TCP, and IP headers.

In the downlink, the RoHC function of the PDCP layer of the gNB 200 (hereinafter referred to as "gNB side RoHC function") performs header compression with the RoHC before performing ciphering. On the other hand, the RoHC function of the PDCP layer of the UE 100 (hereinafter referred to as "UE side RoHC function") performs header decompression (header restoration) with the RoHC after performing deciphering.

For example, the gNB side RoHC function performs state transition in the order of an IR (Initialization and Refresh) state, an FO (First Order) state, and an SO (Second Order) state. In the IR state, the gNB side RoHC function does not compress (i.e. omits transmission of) header information targeted for the compression, but transmits all the header information to the UE side RoHC function.

In the FO state, most of static fields (parameters that hardly vary in units of packets) of the header information targeted for the RoHC compression are compressed. Some static and dynamic fields (parameters that vary in units of packets) are transmitted, without being compressed, to the UE side RoHC function.

In the SO state, a compression ratio of the header is the highest. Transmission of only an RTP sequence number from the gNB-side RoHC function enables the target header to be restored by the UE side RoHC function.

On the other hand, the UE side RoHC function performs state transition in the order of, for example, an NC (No Context) state, an SC (Static Context) state, and an FC (Full Context) state. An initial state of the UE side RoHC function is the NC state, which is a state in which no information (header decompression context) necessary for header decompression is present and decompression processing cannot be successfully performed. The UE side RoHC function, upon receiving the header decompression context, transitions to the FC state. After that, continuous header decompression failure triggers transitions to the SC state and the NC state.

Application of such header compression with the RoHC to the PTM transmission of the MBS packets can reduce overhead due to the header. However, the RoHC is a header compression protocol mainly assuming unicast, and the following problem may occur.

The UE 100 participating in a certain MBS session from the beginning can receive an uncompressed MBS packet on which the header compression processing is not performed from the gNB 200, acquire the header information from the uncompressed MBS packet, and hold information necessary for header decompression (header decompression context).

On the other hand, the UE 100 participating in the middle of the MBS session cannot receive the uncompressed MBS packet on which the header compression processing is not performed from the gNB 200, and thus cannot hold the information (header decompression context) necessary for the header decompression and cannot restore the target header. Therefore, the UE 100 participating in the middle of the MBS session cannot successfully perform MBS packet receiving processing, which is a problem.

In an embodiment, a method as described below is used to enable the UE 100 participating in the middle of the MBS session to successfully perform the MBS packet receiving processing.

In an embodiment, the gNB 200 performing the header compression processing for omitting transmission of the header information which is static information included in a header of the MBS packet, while transmitting a compressed MBS packet subjected to the header compression processing. After starting the transmission of the compressed MBS packet, the gNB 200 transmits header information separately from the compressed MBS packet.

This allows the UE 100 participating in the middle of the MBS session to receive the header information transmitted from the gNB 200 separately from the compressed MBS packet to hold the header information (header decompression context). Therefore, the UE 100 participating in the middle of the MBS session can successfully perform the MBS packet receiving processing. To be more specific, the UE 100 receiving the compressed MBS packet and the header information restores the header of the received compressed MBS packet using the received header information.

In an embodiment, the gNB 200 transmits the compressed MBS packet via the MBS traffic channel. The gNB 200 transmits the header information via a channel different from the MBS traffic channel.

For example, the gNB 200 transmits the header information through a control channel for MBS (MBS control channel) transmitted in broadcast. In this case, the gNB 200 may periodically transmit the header information via the MBS control channel.

The gNB 200 may transmit the header information through a Dedicated Control Channel (DCCH) transmitted in unicast. In this case, the gNB 200 may transmit the header information to the UE 100 when configuring the MBS reception for the UE 100.

Figure 9:
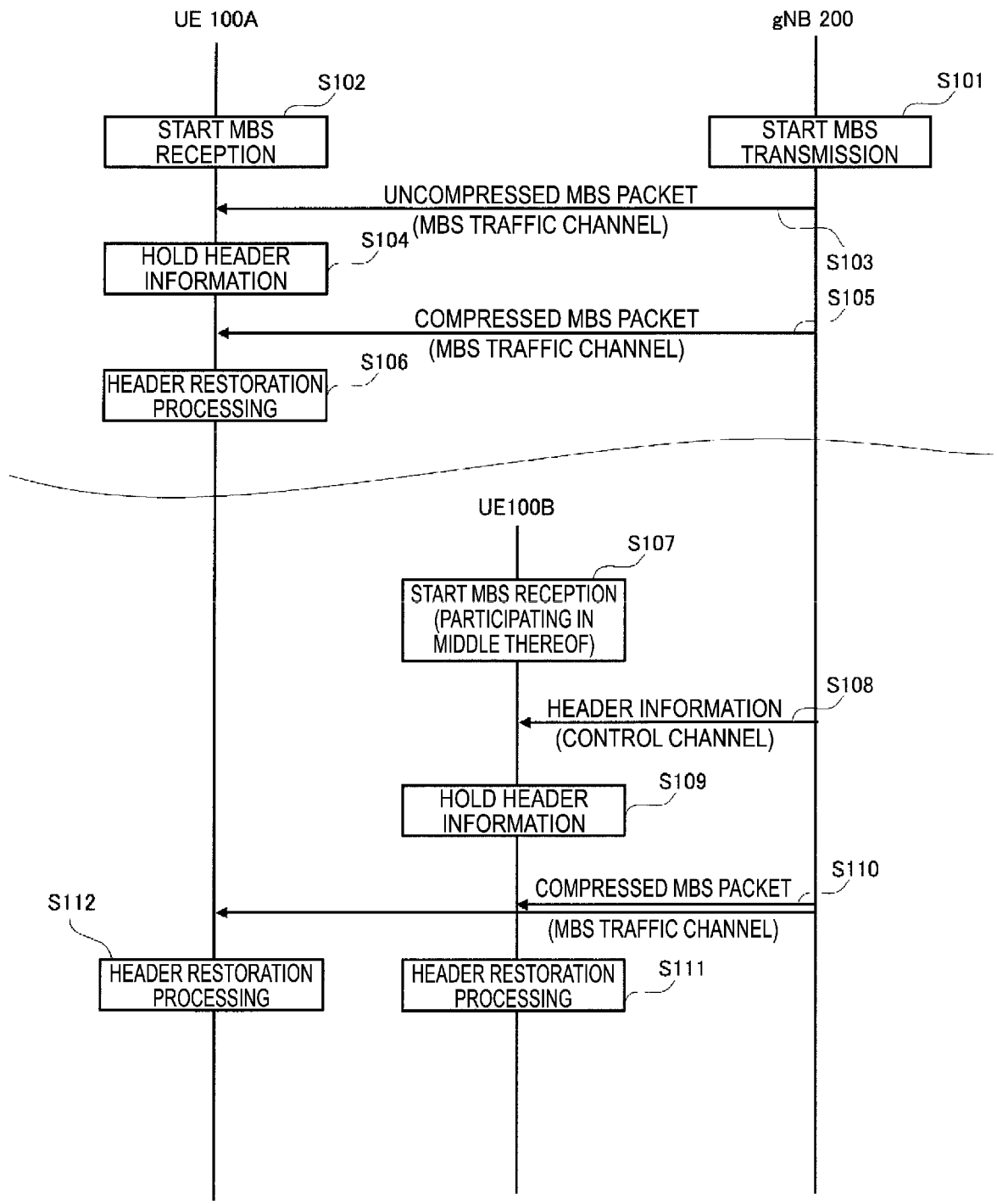
FIG. 9 is a diagram illustrating an operation example of the mobile communication system related to header compression processing according to an embodiment.

FIG. 9 is a diagram illustrating an operation example of the mobile communication system related to the header compression processing according to an embodiment.

As illustrated in FIG. 9, in step S101, the gNB 200 starts MBS transmission for a certain MBS session. In step S102, a UE 100A participating in the MBS session from the beginning starts MBS reception for the MBS session. The UE 100A is in the RRC connected state, the RRC idle state, or the RRC inactive state.

When the UE 100A is not notified of the header information through the control channel (the MBS control channel or the dedicated control channel), the UE 100A may determine that the header information is indicated to be acquired from a received packet or is transmitted in an uncompressed manner in the same manner as usual.

In step S103, the gNB 200 transmits an uncompressed MBS packet in PTM via the MBS traffic channel.

In step S104, the PDCP layer of the UE 100A, upon receiving the uncompressed MBS packet from the gNB 200, acquires the header information targeted for the compression from the received uncompressed MBS packet, and holds the header information (header decompression context).

In step S105, the gNB 200 transmits the compressed MBS packet subjected to the header compression processing in PTM via the MBS traffic channel.

In step S106, the PDCP layer of the UE 100A, upon receiving the compressed MBS packet from the gNB 200, restores the header of the received compressed MBS packet by using the header information held in step S104, and delivers the MBS packet to the higher layer.

After that, in step S107, a UE 100B participates in the middle of the MBS session and starts MBS reception for the MBS session. The UE 100B is in the RRC connected state, the RRC idle state, or the RRC inactive state.

In step S108, the gNB 200 transmits the header information of which transmission is omitted by the header compression processing via the control channel (the MBS control channel or the dedicated control channel). When transmitting a message including the header information, the gNB 200 may include in the message at least one selected from the group consisting of an identifier of the MBS traffic channel corresponding to the header information, an identifier (group RNTI, TMGI, and/or service ID) of the MBS session corresponding to the header information, an identifier of the QoS flow corresponding to the MBS session, an identifier of the bearer, an identifier of the RLC channel, and an identifier of the logical channel.

In step S109, the PDCP layer of the UE 100B, upon receiving the header information from the gNB 200, holds the received header information (header decompression context). The PDCP layer of the UE 100B may hold the identifier described above received from the gNB 200 in association with the header information (header decompression context). Note that when the UE 100B, when notified of the header information from the gNB 200, may determine that the indication that the header information cannot be (or may not) be acquired from the received packet is received.

In step S110, the gNB 200 transmits the compressed MBS packet subjected to the header compression processing in PTM via the MBS traffic channel.

In step S111, the PDCP layer of the UE 100B, upon receiving the compressed MBS packet from the gNB 200, restores the header of the received compressed MBS packet by using the header information held in step S109, and delivers the MBS packet to the higher layer.

In step S112, the PDCP layer of the UE 100A, upon receiving the compressed MBS packet from the gNB 200, restores the header of the received compressed MBS packet using the header information held in step S104, and delivers the MBS packet to the higher layer.

Figure 10:
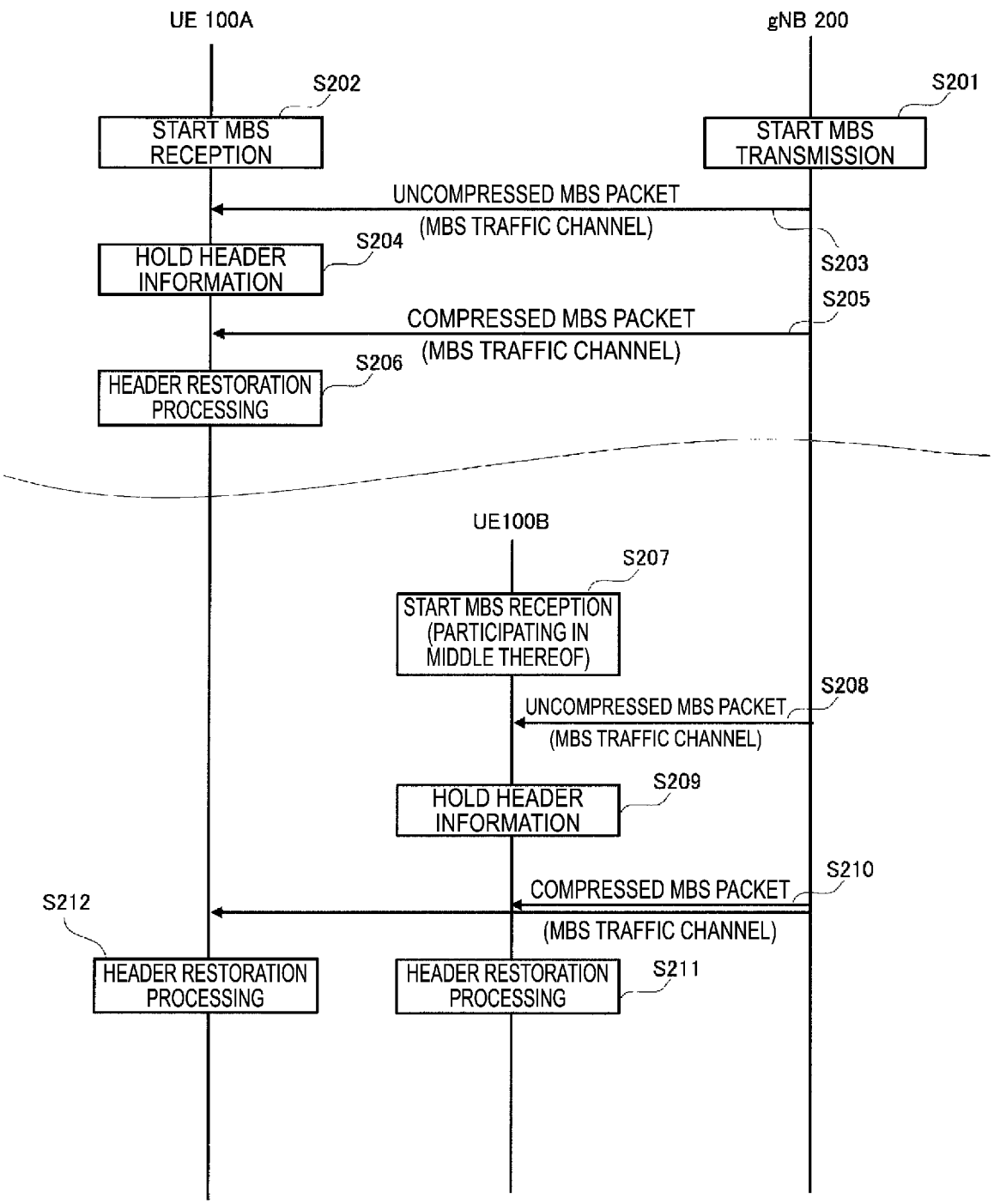
FIG. 10 is a diagram illustrating another operation example the mobile communication system related to the header compression processing according to an embodiment.

FIG. 10 is a diagram illustrating another operation example the mobile communication system related to the header compression processing according to an embodiment. In this operation example, the gNB 200 transmits an uncompressed MBS packet not subjected to the header compression processing in a predetermined periodicity. To be more specific, the gNB 200, after starting the transmission of the compressed MBS packet subjected to the header compression processing, transmits the uncompressed MBS packet at a predetermined periodicity.

As illustrated in FIG. 10, the operations in steps S201 to S207 are the same as and/or similar to, the operations in steps S101 to S107 in FIG. 9.

In step S208, the gNB 200 transmits the uncompressed MBS packet in PTM via the MBS traffic channel. The gNB 200 may transmit the uncompressed MBS packet via the control channel (the MBS control channel or the dedicated control channel).

In step S209, the PDCP layer of the UE 100B, upon receiving the uncompressed MBS packet from the gNB 200, acquires the header information targeted for the compression from the received uncompressed MBS packet, and holds the header information (header decompression context).

The operations in steps S210 to S212 are the same as and/or similar to, the operations in steps S110 to S112 in FIG. 9.

In this operation example, the gNB 200 may determine the predetermined periodicity for transmitting the uncompressed MBS packet in accordance with a QoS requirement of the MBS session. Alternatively, a periodicity length determined in accordance with the QoS requirement of the MBS session may be notified to the gNB 200 from the core network (AMF or the like). Note that the periodicity length is determined from an allowable amount of access delay to the MBS session from the UE 100.

The predetermined periodicity at which the gNB 200 transmits the uncompressed MBS packet may be associated with (or synchronized with) modification timing (modification boundary) of the MBS control channel. For example, the gNB 200 transmits the uncompressed data in a subframe the same as (or in an MBS traffic channel transmission occasion immediately after) the modification boundary of the MBS control channel.

The predetermined periodicity at which the gNB 200 transmits the uncompressed MBS packet is preferably timing at which the UE 100 and the gNB 200 are synchronized. For example, the gNB 200 transmits the uncompressed packet in a frame obtained by a calculation equation of "SFN mod 256=0". Here, SFN represents a system frame number. The uncompressed packet may be transmitted in a frame obtained by a calculation equation of "SFN mod N=0", where N may be a value configured from the gNB 200 for the UE 100.

Handling of PDCP Variables

A PDCP variable in an embodiment is described.

The PDCP layer of the UE 100 configures and updates a PDCP variable in accordance with a PDCP sequence number (PDCP SN) included in the packet received from the gNB 200. Typically, the UE 100B configures zero to an initial value of the PDCP variable and updates (increments) the PDCP variable in response to receiving a packet from the gNB 200.

The UE 100 participating in a certain MBS session from the beginning can sequentially update the PDCP variables to bring the PDCP variables to the latest state. On the other hand, since the UE 100 participating in the middle of the MBS session may receive an MBS packet having a PDCP sequence number greatly different from the initial value, the UE may not successfully perform the operation of the PDCP layer (predetermined PDCP operation).

In an embodiment, a method as described below is used to enable the UE 100 participating in the middle of the MBS session to successfully perform the predetermined PDCP operation.

In an embodiment, the PDCP entity of the UE 100 configures a PDCP sequence number included in an MBS packet received first from the gNB 200 to an initial value of a variable (PDCP variable) used for the predetermined PDCP operation. Specifically, the PDCP entity of the UE 100, in receiving the MBS packet transmitted in PTM, does not configure zero to the PDCP variable, but configures the PDCP sequence number included in the MBS packet received first from the gNB 200 to the initial value of the PDCP variable. This allows the UE 100 participating in the middle of the MBS session to successfully perform the predetermined PDCP operation.

In an embodiment, the predetermined PDCP operation is a receive window control and/or a packet reordering operation.

A PDCP variable used for the reception window control may be at least one of RX_NEXT and RX_DELIV. RX_NEXT is a sequence number of a PDCP SDU expected to be received next. RX_DELIV is a sequence number of the oldest of the PDCP SDUs awaiting being received and not yet provided to the higher layer. Typically, initial values of RX_NEXT and RX_DELIV are "0".

A PDCP variable used for the packet reordering may be RX_REORD. RX_REORD is a sequence number of the PDCP SDU starting a timer indicating the maximum time to wait for the packet reordering. For example, when the sequence number of the received packet is smaller than the sequence number of the PDCP SDU, the UE 100 discards the packet.

Figure 11:
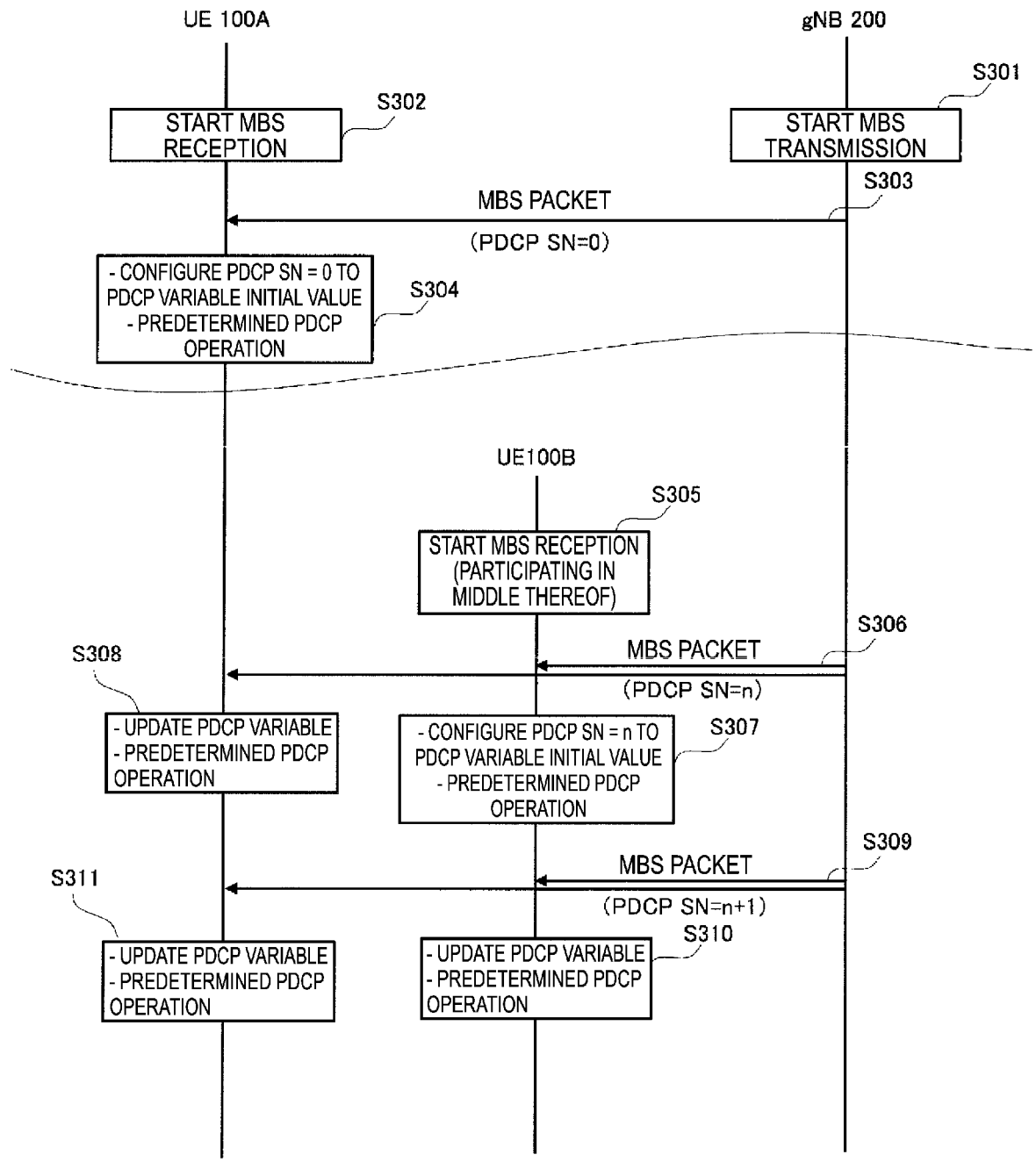
FIG. 11 is a diagram illustrating an operation example of the mobile communication system related to a PDCP variable according to an embodiment.

FIG. 11 is a diagram illustrating an operation example of the mobile communication system related to the PDCP variable according to an embodiment.

As illustrated in FIG. 11, in step S301, the gNB 200 starts MBS transmission for a certain MBS session. In step S302, the UE 100A participating in the MBS session from the beginning starts MBS reception for the MBS session. The UE 100A is in the RRC connected state, the RRC idle state, or the RRC inactive state. The UE 100A may receive a configuration of the MBS bearer (PDCP) from the gNB 200 and perform the configuration.

In step S303, the gNB 200 transmits the MBS packet (PDCP packet) via the MBS bearer in PTM. It is assumed that a sequence number (PDCP sequence number) included in the PDCP header of this MBS packet (PDCP packet) is "0".

In step S304, the PDCP layer of the UE 100A, upon receiving the MBS packet from the gNB 200, configures the PDCP sequence number "0" included in the received MBS packet to an initial value of the PDCP variable and performs a predetermined PDCP operation.

After that, in step S305, the UE 100B participates in the middle of the MBS session and starts MBS reception for the MBS session. The UE 100B is in the RRC connected state, the RRC idle state, or the RRC inactive state. The UE 100B may receive a configuration of the MBS bearer (PDCP) from the gNB 200 and perform the configuration.

In step S306, the gNB 200 transmits the MBS packet (PDCP packet) via the MBS bearer in PTM. It is assumed that a sequence number (PDCP sequence number) included in the PDCP header of this MBS packet (PDCP packet) is "n". Here, "n" represents an integer of 1 or more.

In step S307, the PDCP layer of the UE 100B, upon firstly receiving the MBS packet (PDCP packet) via the MBS bearer, configures the PDCP sequence number "n" included in the firstly received MBS packet to an initial value of the PDCP variable and performs a predetermined PDCP operation. For example, the PDCP layer of the UE 100B configures RX_DELIV=the sequence number "n" of the packet and RX_NEXT=the sequence number "n" of the packet. Alternatively, (n+1) mod [SN size] may be used.

In step S308, the PDCP layer of the UE 100A, upon receiving the MBS packet (PDCP packet) via the MBS bearer, updates the PDCP variable with the PDCP sequence number "n" included in the received MBS packet.

In step S309, the gNB 200 transmits the MBS packet (PDCP packet) via the MBS bearer in PTM. It is assumed that a sequence number (PDCP sequence number) included in the PDCP header of this MBS packet (PDCP packet) is "n+1".

In step S310, the PDCP layer of UE 100B, upon receiving the MBS packet (PDCP packet) via the MBS bearer, updates the PDCP variable with the PDCP sequence number "n+1" included in the received MBS packet.

In step S311, the PDCP layer of UE 100A, upon receiving the MBS packet (PDCP packet) via the MBS bearer, updates the PDCP variable with the PDCP sequence number "n+1" included in the received MBS packet.

In this operation example, the initial value of each PDCP variable is updated from the received MBS packet, but the operation is not limited to this. The initial value of each PDCP variable may be configured by the gNB 200 for the UE 100. For example, the UE 100B performing the MBS reception in the middle of the session may be given the initial value of each PDCP variable by the gNB 200, when the MBS reception is configured through dedicated signaling.

Handling of SDAP Header

An SDAP header in an embodiment is described.

Figure 12:
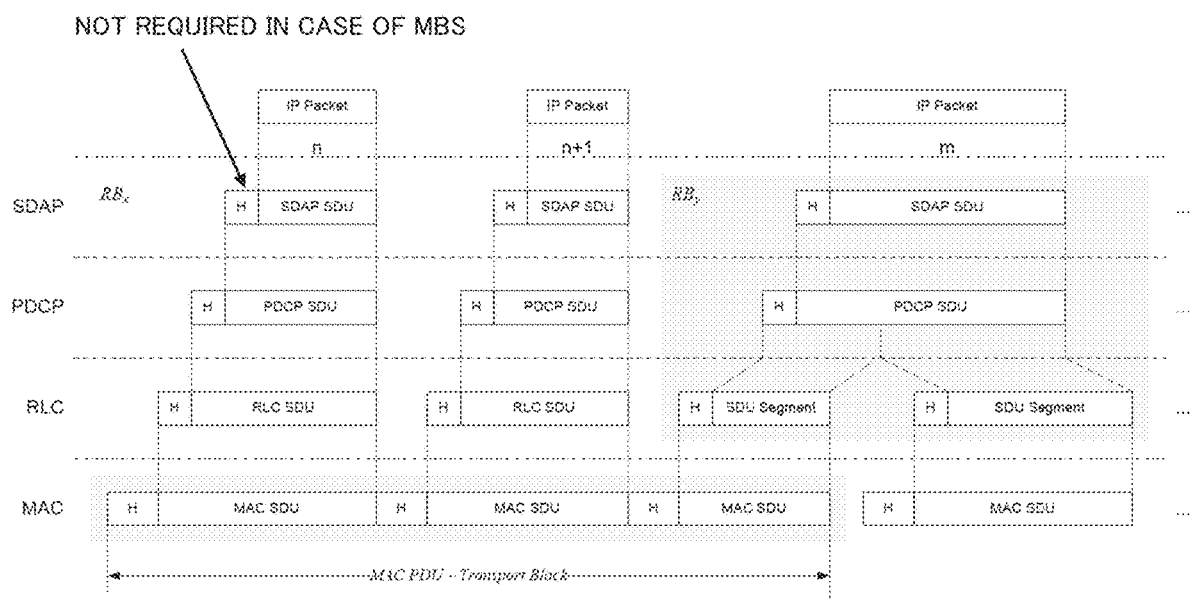
FIG. 12 is a diagram illustrating a data flow in the gNB and the UE according to an embodiment.

FIG. 12 is a diagram illustrating a data flow in the gNB 200 and the UE 100. Here, the downlink is described.

As illustrated in FIG. 12, the SDAP layer of the gNB 200 performs a processing of associating (mapping) the QoS flow with the radio bearer, and adds the SDAP header including the identifier of the QoS flow to a SDAP SDU (i.e., an IP packet) to deliver the SDAP SDU to the PDCP layer. On the other hand, the SDAP layer of the UE 100 receives the SDAP PDU from the PDCP layer, removes the SDAP header added to the SDAP PDU, and delivers the SDAP SDU (i.e., the IP packet) to the higher layer.

Here, the SDAP header includes the QoS flow identifier, but in the case of only the downlink such as the MBS, the QoS flow identifier does not make much sense for the following reasons 1 to 3. Therefore, a format without the SDAP header is used for the MBS in order to reduce the overhead.

Reason 1: Reflective mapping (an operation of determining a QoS flow identifier of an uplink packet from a QoS flow identifier of a downlink packet) does not require a QoS flow identifier in the case of the MBS.

Reason 2: Although the QoS flow is a minimum unit for QoS control in the core network, the QoS control in unit of bearer is used in the radio and the QoS control is not used particularly in the UE 100, so that the QoS flow identifier is not required for the MBS in the case of only the downlink.

Reason 3: Even if an uplink for feedback is present, the feedback is in the HARQ, RLC, and PDCP layers, not in the SDAP layer, and it is a control PDU, so the control in unit of QoS flow is required.

Therefore, in an embodiment, the UE 100 receiving the MBS packet from the gNB 200 via the MBS data bearer considers that the SDAP header is not added to the received MBS packet in the SDAP layer, and delivers the MBS packet (IP-packet) to the higher layer without performing SDAP header removal processing on the MBS packet.

This eliminates the need to explicit configuration of the presence or absence of the SDAP header in the RRC layer for the MBS data bearer. The UE 100 determines that transmission is performed for the MBS data bearer without the SDAP header regardless of the configuration of the presence of the SDAP header in the RRC. That is, even when the UE 100 receives the configuration information (RRC configuration information) regarding the configuration of the SDAP layer from the gNB 200, the UE 100 delivers the MBS packet to the higher layer without performing the SDAP header removal processing on the received MBS packet regardless of the configuration information.

Multiplex Transmission of Plurality of Logical Channels

A logical channel in an embodiment is described.

As for usual unicast transmission, the gNB 200 can multiplex a plurality of logical channels corresponding to a plurality of applications by one C-RNTI (Cell Radio Network Temporary Identifier), that is, one PDSCH (Physical Downlink Shared Channel) and transmit the multiplexed channels.

As for the MBS, like the unicast transmission, the PTP transmission is considered to be able to multiplex and transmit an MBS packet (logical channel for MBS) and a usual unicast packet (logical channel for unicast) by using one C-RNTI (one PDSCH).

On the other hand, because of simultaneous transmission to a large number of UEs and transmission timing (periodicity) different for each MBS service, the PTM transmission is generally considered to be unable to multiplex a plurality of logical channels by using one group RNTI (one PDSCH).

However, since the core network (5GC 20) performs the QoS control in unit of QoS flow, one MBS service may include a plurality of QoS flows. As described above, the SDAP layer of the gNB 200 maps the QoS flow to the bearer (=logical channels.

Accordingly, a plurality of QoS flows belonging to one MBS service may be mapped to different logical channels, multiplexed by one RNTI (one group RNTI) in the MAC layer, and transmitted.

In an embodiment, the gNB 200 maps one or more QoS flows belonging to one MBS session to a plurality of MBS data bearers in the SDAP layer. Then, the gNB 200 multiplexes a plurality of logical channels corresponding to the plurality of MBS data bearers by one RNTI (one group RNTI) and transmits the multiplexed channels. This allows a plurality of logical channels to be efficiently transmitted.

Figure 13:
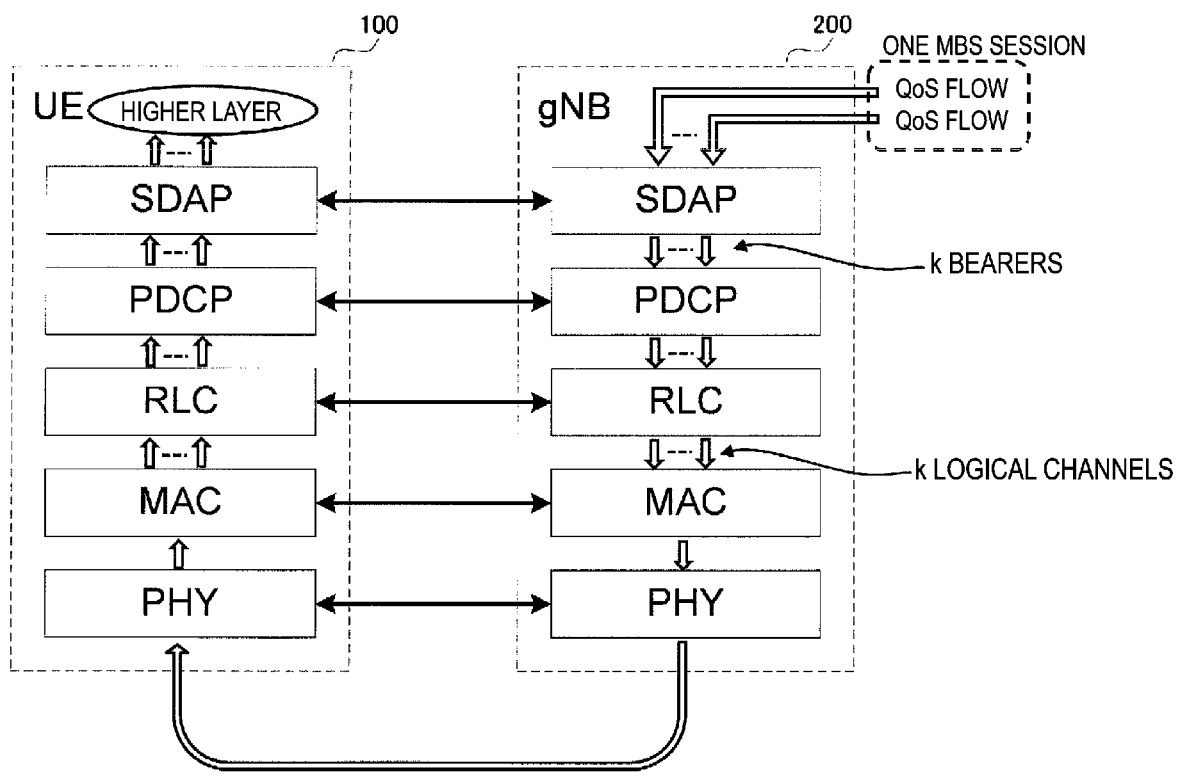
FIG. 13 is a diagram illustrating an operation example of multiplex transmission of a plurality of logical channels according to an embodiment.

FIG. 13 is a diagram illustrating an operation example of multiplex transmission of a plurality of logical channels according to an embodiment.

As illustrated in FIG. 13, in the gNB 200 performing PTM transmission of the MBS data, the SDAP layer maps a plurality of QoS flows belonging to one MBS session to k bearers. Here, "k" represents an integer of 2 or more. The plurality of QoS flows belonging to one MBS session refers to a plurality of QoS flows associated with one session identifier. The RLC layer of the gNB 200 delivers the MBS data of k logical channels corresponding to k bearers (k RLC channels) to the MAC layer.

The MAC layer of the gNB 200 multiplexes the MBS data of k logical channels by one group RNTI and transmits the multiplexed data. To be more specific, the physical (PHY) layer of the gNB 200 transmits allocation information of a PDSCH carrying the MBS data to the UE 100 by one PDCCH (Physical Downlink Control Channel) to which one group RNTI is applied.

As described above, only when different QoS flows mapped to different logical channels are associated with one MBS session, the gNB 200 multiplexes the different logical channels by one group RNTI and transmits the multiplexed channels.

On the other hand, the physical (PHY) layer of the UE 100 receives the PDSCH associated with the group RNTI. When k logical channels are included as a result of decoding the PDSCH, the MAC layer of the UE 100 delivers the MBS data to the RLC layer via the corresponding logical channel.

Here, the UE 100 may determine that the k logical channels are associated with one MBS session because the k logical channels are transmitted using the same group RNTI.

The SDAP layer of the UE 100 then delivers the MBS data of the k bearers (a plurality of QoS flows) to the higher layer (e.g., application layer).

Other Embodiments

In the embodiment described above, an example in which the base station is an NR base station (i.e., a gNB) is described; however, the base station may be an LTE base station (i.e., an eNB). The base station may be a relay node such as an integrated access and backhaul (IAB) node. The base station may be a distributed unit (DU) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing the processes to be performed by the UE 100 or the gNB 200 may be integrated, and at least part of the UE 100 or the gNB 200 may be configured as a semiconductor integrated circuit (a chipset or an SoC).

Embodiments have been described above in detail with reference to the drawings, but specific configurations are not limited to those described above, and various design variation can be made without departing from the gist of the present disclosure.

REFERENCE SIGNS

10: NG-RAN (5G RAN)
20: 5GC (5G CN)
100: UE
110: Receiver
120: Transmitter
130: Controller
200: gNB
210: Transmitter
220: Receiver
230: Controller
240: Backhaul communicator

The invention claimed is:

1. A communication control method used in a mobile communication system, the mobile communication system providing a multicast broadcast service (MBS) from a base station to a user equipment, the communication control method comprising:

receiving, by the user equipment, an MBS packet from the base station; and configuring, by a Packet Data Convergence Protocol (PDCP) entity of the user equipment, based on a PDCP sequence number included in the MBS packet received first from the base station, an initial value of a PDCP variable used for a receive window control, wherein the PDCP variable is at least one of a first variable and a second variable, the first variable including a sequence number of next PDCP SDU expected to be received, the second variable including a sequence number of the oldest of PDCP SDUs awaiting being received and not yet provided to the higher layer.

2. A user equipment comprising a receiver configured to receive a multicast broadcast service (MBS) packet from a base station; and a controller configured to configure, based on a Packet Data Convergence Protocol (PDCP) sequence number included in the MBS packet received first from the base station, an initial value of a PDCP variable used for a receive window control, wherein the PDCP variable is at least one of a first variable and a second variable, the first variable including a sequence number of next PDCP SDU expected to be received, the second variable including a sequence number of the oldest of PDCP SDUs awaiting being received and not yet provided to the higher layer.

3. An apparatus for controlling a user equipment, the apparatus comprising a processor and a memory, the processor configured to receive a multicast broadcast service (MBS) packet from a base station, and configure, based on a Packet Data Convergence Protocol (PDCP) sequence number included in the MBS packet received first from the base station, an initial value of a PDCP variable used for a receive window control, wherein the PDCP variable is at least one of a first variable and a second variable, the first variable including a sequence number of next PDCP SDU expected to be received, the second variable including a sequence number of the oldest of PDCP SDUs awaiting being received and not yet provided to the higher layer.

* * * * *